Oct. 17, 1933.  A. W. KEUFFEL  1,930,852
SLIDE RULE
Filed April 8, 1931
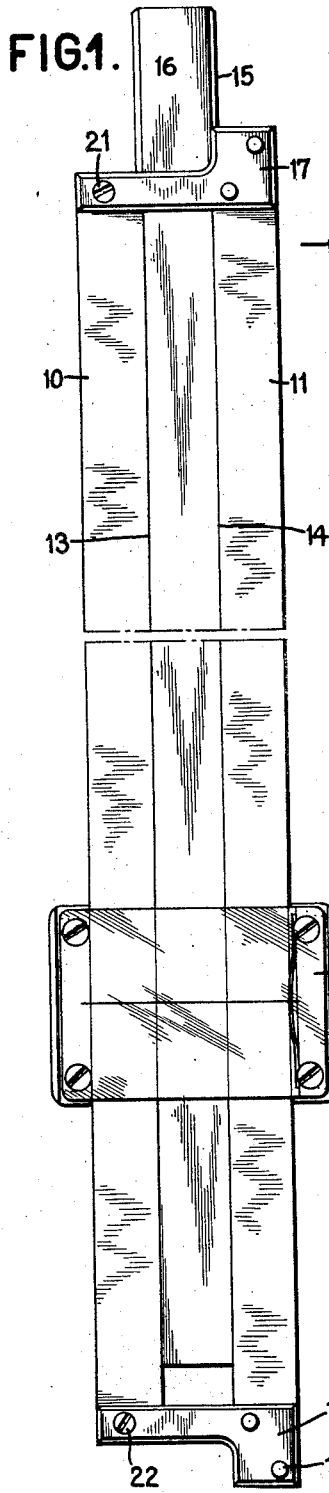
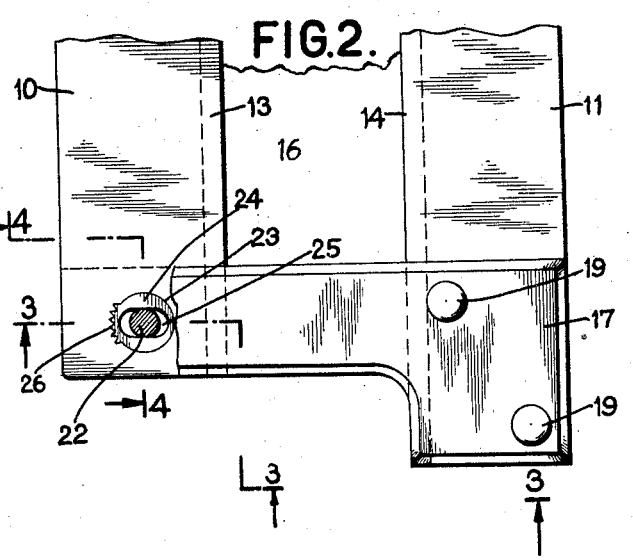
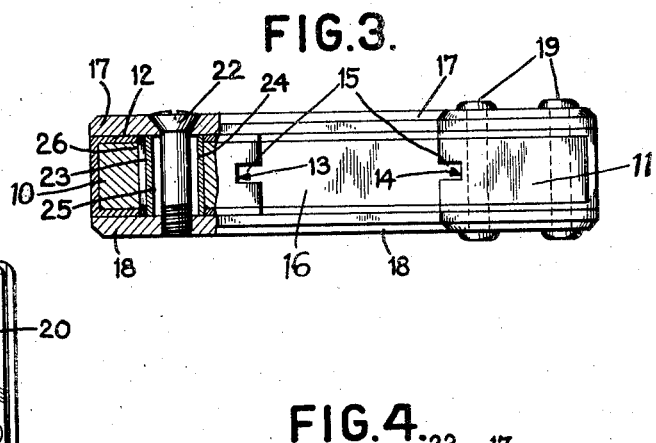
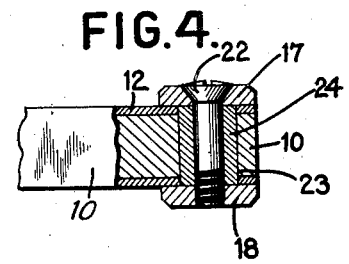
Inventor
ADOLF W. KEUFFEL
By his Attorneys
Bohleber + Ledbetter Patented Oct. 17, 1933

1,930,852

UNITED STATES PATENT OFFICE 1,930,852

SLIDE RULE

Adolf W. Keuffel, Montclair, N. J., assignor to Keuffel & Esser Co., Hoboken, N. J., a corporation of New Jersey Application April 8, 1931. Serial No. 528,598

3 Claims. (Cl. 235—70)

This invention relates broadly to slide rules and more particularly to that type of slide rule in which a slide is adapted to reciprocate between two relatively fixed members, the exposed surfaces of both sides of the slide and the fixed members being generally provided with composition faces and being graduated in accordance with mathematical principles, well known to those skilled in the art.

In such slide rules, it has been found that variations in atmospheric conditions have caused contraction or expansion of the calibrated face members or the material to which they are secured, so that the original adjustment between the relatively movable members is no longer satisfactory and they bind and become difficult to position, or become too loose and cause inaccuracies in computations by virtue of an excessive amount of play therebetween. Such conditions may also arise through continued use. Known constructions have sought to overcome these difficulties and to permit the accurate adjustment of such slide rules, yet these constructions have not solved the problem in as exact and precise a manner as has the present invention nor provided structures which retain the capacity for accuracy of adjustment after continued use.

It is an object of the present invention to provide a new and improved slide rule construction wherein a better and more accurate adjustment of parts may be made to correct improper relative positionings between movable members, such as may be caused by variations in atmospheric conditions or by blows as when the slide rule is dropped or otherwise in use.

The invention also seeks to facilitate the restoration of the parts to the desired position of adjustment and their permanent retention in such position over a period of continued use.

The invention also seeks a slide rule which is practical from the standpoint of ease and cheapness of manufacture and durability and convenience in use.

In accordance with the invention, the relatively stationary members of the slide rule, between which the movable member reciprocates, are united with provision for adjustment by pairs of connecting members or frames embracing the slide rule and preferably disposed, respectively, near each end thereof. These frames are each secured to one of the relatively stationary members by a connection which usually does not permit of adjustment whereas the connection between the other end of the connecting frame and the other relatively stationary member, at either or both ends of the slide rule, is adjustable by means of a pin and slot connection. Preferably a pin extends between the free ends of each pair of frame members and passes through the relatively stationary member, the pin being retained against relative movement with respect to one of the connected parts and being capable of relative movement with respect to the other connected part. This may be accomplished conveniently by forming one of the parts with a hole of a size substantially just sufficient to receive the pin while the other part is formed with a slot permitting relative movement in a direction perpendicular to the major axis of the slide rule. More particularly, the pin passes through holes in the ends of metallic frames and is movable within a slot formed in a bushing, preferably formed of metal or other wear resisting material, and, if desired, held against movement, in the relatively stationary member.

These and other objects of the invention and the means for their attainment will be more apparent from the following detailed description taken in connection with the accompanying drawing illustrating one embodiment by which the invention may be realized and in which:—

Figure 1 is a view showing, in plan, a slide rule of a type adapted for use with the invention, an intermediate section being cut away.

Figure 2 is an enlarged fragmentary plan of one end of the rule illustrated in Figure 1, with parts cut away in the interest of clearness.

Figure 3 is an end elevational view, partly in section, taken on the broken line 3—3 of Figure 2.

Figure 4 is a transverse sectional view taken on the broken line 4—4 of Figure 2.

Reference characters 10 and 11 designate rule members or side bars of wood or other suitable material which are relatively stationary and are fixed relative to each other by pairs of transverse spacing members or connecting frames 17 and 18, preferably made of metal, which are disposed near their ends and which space the side bars apart in order to allow the slide 16 to be reciprocated therebetween. Longitudinal grooves 13 and 14 are provided in the inner sides of bars 10 and 11 to receive the tongues 15 on the slide 16. On both side bars 10 and 11 and slide 16 may be secured strips or sheets 12 of a composition, such as pyroxylin or other suitable material having the required scales depicted thereon.

The transverse frame or holding members 17, 18 are firmly secured to one of the side bars, 11, say by rivets 19 or the equivalent, and adjustably secured at the other end. The adjustable connection between the frame members 17 and 18 and the relatively stationary member 10 comprises a pin and slot connection. Bar 10 is formed with a hole 23 in which is inserted a bushing 24 of metal or other wear resisting material. An elongated slot 25 is formed in the bushing 24, the smaller dimension of the slot being of a size to accommodate a pin, shown as the screw 22, with the least amount of clearance possible and the longer dimension being accurately centered transversely of the rule and permitting movement of the side bar 10 with respect to the bolt 22 in a direction perpendicular to the bar 11, in adjustment. Preferably, screw 22 and bushing 24 are made of the same material in order to insure equal expansion and contraction under varying degrees of temperature. Screw 22 is provided at one end with a head adapted to be received in a hole in the frame member 17 and at the other end with threads adapted to engage a complementary threaded hole in companion transverse frame member 18, as shown in Figures 3 and 4. The other end of the rule, not shown in detail, is provided with a hole which permits movement around bolt 21, both longitudinally and transversely of the device, or in all directions, or it may be provided with a similar pin and slot connection, if desired.

The bushing 24 may be accurately placed in rule 10 and locked therein by one or more fixing teeth 26, as shown, on the bushing, which teeth may extend partly or wholly around the bushing and be embedded in the material of the side bar 10. In some situations only a single tooth may be sufficient to prevent relative movement of the bushing in the side bar.

Pin 22 and slot 24 may be machined with great accuracy so that there is practically no play therebetween. It is impossible for the bar 10 to vary its position longitudinally from the precise longitudinal position it is held in by frame members 17 and 18 and pin 22, frame members 17 and 18 having been truly aligned and squared with member 11. By the pin and bushing connection of this invention any longitudinal play between members 10 and 17, 18 is reduced to an absolute minimum, thereby increasing the accuracy and precision of the instrument and enhancing its value. Moreover the body of the wood or composition rule member 10 is kept away from pin 22, thus avoiding all chance of its swelling or warping against the pin and throwing the instrument out of adjustment or alignment as well as avoiding all wear of the softer material of the side bar. Furthermore, the bushing 24 serves as a rigid spacing element of constant dimension between the frame members 17 and 18 which limits the approach of the frame members and prevents damage to the material of the side bar 11 when the frame members are drawn together by the screw 22 and thus a more rigid connection is provided for these parts of the slide rule.

In the manufacture of slide rules, it is often difficult to properly secure the rule and cross members or frames because of the interference caused by rough or jagged edges in the adjusting hole, which must be cut or punched through wood or other fibrous or composition material relatively soft in nature and therefore cannot be made with any great degree of accuracy. By the herein described invention this difficulty also is entirely avoided and accurately machined elements are provided throughout the adjusting mechanism in order to insure a perfect cooperation of parts.

Various modifications will occur to those skilled in the art in the composition, disposition and configuration of the component elements going to make up the invention as a whole and no limitation is intended by the phraseology of the foregoing specification or illustrations in the accompanying drawing, except as indicated in the appended claims.

What is claimed is:—

1. In a slide rule construction, a pair of side members affected by changes in atmospheric conditions, a member affected by changes in atmospheric conditions mounted to slide between them, metallic spacing members fixed to both sides of one side member and extending over both sides of the other, a slotted wear resistant bushing embedded in said other side member, said slot extending transversely of the side member, a screw extending through said slot, the head of said screw engaging the top spacing member and the end of said screw being threaded into the bottom spacing member.

2. In a slide rule construction, a pair of side members affected by atmospheric conditions, a member affected by atmospheric conditions mounted to slide between them, metallic spacing members fixed to both sides of one side member and extending over both sides of the other, a slotted metallic bushing embedded in said other side member and extending from side to side to be engaged at each end by the spacing members respectively, said slot extending transversely of the side member, a screw extending through said slot, the head of said screw being recessed in the top spacing member and the end of said screw being threaded into the bottom spacing member and means to prevent relative movement between the bushing and the material in which it is embedded.

3. In a slide rule construction, a pair of side members, a member mounted to slide therebetween, spacing members fixed to both sides of one side member and extending over both sides of the other side member, connecting means between the spacing members to clamp the side member therebetween and rigid means carried with the last named side member to limit the movement of approach of the spacing members.

ADOLF W. KEUFFEL.